(12) United States Patent
Åkerlund (10) Patent No.: US 8,768,368 B2
(45) Date of Patent: Jul. 1, 2014

(54) METHOD AND ARRANGEMENT FOR IMPROVED RADIO NETWORK PLANNING, SIMULATION AND ANALYZING IN TELECOMMUNICATIONS

(75) Inventor: Mats Åkerlund, Upplands Väsby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 674 days.

(21) Appl. No.: 12/594,028

(22) PCT Filed: Apr. 4, 2007

(86) PCT No.: PCT/SE2007/050219
§ 371 (c)(1),
(2), (4) Date: Oct. 9, 2009

(87) PCT Pub. No.: WO2008/123809
PCT Pub. Date: Oct. 16, 2008

(65) Prior Publication Data
US 2010/0105399 A1    Apr. 29, 2010

(51) Int. Cl.
*H04W 40/00* (2009.01)
(52) U.S. Cl.
USPC ...... 455/446; 455/423; 455/67.11; 455/456.1
(58) Field of Classification Search
USPC ............ 455/422.1–425, 446, 456.1, 67.11
See application file for complete search history.

(56) References Cited

U.S. PATENT DOCUMENTS 5,095,500 A * 3/1992 Tayloe et al. ............. 379/32.01

(Continued)

FOREIGN PATENT DOCUMENTS

| EP | 1175115 A2 | 1/2002 |
|---|---|---|
| EP | 1357766 A1 | 10/2003 |

(Continued)

OTHER PUBLICATIONS

Backman, W. "Signal Level Interpolation for Coverage Area Prediction." IEEE 60th Vehicular Technology Conference, 2004 (VTC2004-Fall), vol. 1, Sep. 26-29, 2004, pp. 67-71.

*Primary Examiner* — Sharad Rampuria
(74) *Attorney, Agent, or Firm* — Coats & Bennett, P.L.L.C.

(57) ABSTRACT

In a method of enabling improved radio network planning for a predetermined geographical area in a telecommunication network, providing a plurality of data sampled at irregularly distributed measurement points, each data sample being represented by at least two geographical coordinates and at least one parameter value representative of a physical quantity associated with a radio network planning procedure, and providing a regular grid comprising a plurality of grid bins. For each such measurement point locating a subset of said grid bins within a predetermined distance from the measurement point and determining a respective contribution from the measurement point at each located grid bin in the subset, based at least on a respective distance between the data point and each grid bin and the at least one parameter value of the measurement point, wherein at least a subset of the grid bins each receive contributions from at least three associated measurement points referred to as contributing measurement points, and wherein each such grid bin is referred to as an active or triggered grid bin. Finally, determining, for each active or triggered grid bin a value of the parameter based on the determined respective contributions from the associated contributing measurement points.

10 Claims, 4 Drawing Sheets

(56) References Cited

U.S. PATENT DOCUMENTS

| | | | |
|---|---|---|---|
| 5,561,841 A * | 10/1996 | Markus | 455/446 |
| 5,987,306 A * | 11/1999 | Nilsen et al. | 455/67.11 |
| 6,438,376 B1 * | 8/2002 | Elliott et al. | 455/437 |
| 6,516,195 B1 * | 2/2003 | Zadeh et al. | 455/446 |
| 6,606,494 B1 * | 8/2003 | Arpee et al. | 455/422.1 |
| 6,792,269 B2 * | 9/2004 | Boehmke | 455/424 |
| 6,795,707 B2 * | 9/2004 | Martin et al. | 455/446 |
| 6,985,735 B2 * | 1/2006 | Gustafsson | 455/446 |
| 6,987,973 B2 * | 1/2006 | Wawrzynski et al. | 455/450 |
| 7,065,351 B2 * | 6/2006 | Carter et al. | 455/423 |
| 7,164,883 B2 * | 1/2007 | Rappaport et al. | 455/3.01 |
| 7,389,114 B2 | 6/2008 | Ju et al. | |
| 7,583,961 B2 | 9/2009 | Kappes et al. | |
| 7,664,492 B1 * | 2/2010 | Lee et al. | 455/424 |
| 7,877,095 B2 * | 1/2011 | Hubner et al. | 455/446 |
| 7,890,060 B2 * | 2/2011 | Lehtinen | 455/67.11 |
| 7,917,147 B2 * | 3/2011 | Bond | 455/446 |
| 8,098,590 B2 * | 1/2012 | Catovic et al. | 370/252 |
| 2003/0186693 A1 * | 10/2003 | Shafran et al. | 455/423 |
| 2006/0003774 A1 | 1/2006 | Byun et al. | |
| 2007/0010204 A1 * | 1/2007 | Hubner et al. | 455/63.1 |

FOREIGN PATENT DOCUMENTS

| | | |
|---|---|---|
| JP | 04131730 A | 5/1992 |
| JP | 04174362 A | 6/1992 |
| JP | H11211768 A | 8/1999 |
| JP | 2000275068 A | 10/2000 |
| JP | 2005229616 A | 8/2005 |
| JP | 2005318603 A | 11/2005 |
| WO | 02/073997 A1 | 9/2002 |
| WO | 03045094 A1 | 5/2003 |
| WO | 2005069666 A1 | 7/2005 |
| WO | 2005076645 A1 | 8/2005 |
| WO | 2005076646 A1 | 8/2005 |

\* cited by examiner

METHOD AND ARRANGEMENT FOR IMPROVED RADIO NETWORK PLANNING, SIMULATION AND ANALYZING IN TELECOMMUNICATIONS

TECHNICAL FIELD

The present invention relates to methods for efficient use of randomly distributed measurement data, and specifically to methods and arrangements for converting randomly geographically distributed measurement points into a regular geographical grid to enable a more efficient radio network planning in a telecommunication system.

BACKGROUND

All present day telecommunication systems are dependent on accurate measurements of various parameters over a geographical area in order to provide ample coverage and optimal transmission paths over that area. The measurements are usually collected at various geographical locations, typically represented by discrete points (X; Y; Z) where X and Y typically denotes the 2-D position and Z any measurable value at the point. Among the different parameters to be measured are signal strength, altitude, radio characteristics, geographical characteristics etc. However, also other parameters are plausible.

In order to be able to perform efficient analyses based on the measured data from the various discrete points, it is often desired and necessary to convert the data into a regular grid or raster.

Several known methods exist to enable interpolation of irregularly scattered data points into a regular raster or grid. All methods have their advantages and disadvantages. Some of those interpolation methods are considered to be more exact, in the sense that they honor the original sampled points upon which the interpolation is based. Different methods can also produce a more or less smoothing effect on the result.

Some of the most well known methods for point to area interpolations are the Triangulated Irregular Network (TIN), Kriging, polynomial regression, and natural regions. The natural regions method is also known as Voronoi polygons, or Thiessen polygons, and is mostly used for gridding of qualitative data points, since no new point values are computed. The other three methods will interpolate new values to fill the unsampled points. TIN and Kriging can be classified as exact methods, although it may not always be the truth. Polynomial regression is a method that among some is most favoured, since it is possible to include more parameters in the interpolation than only the position of the sampled points. In its most simple form polynomial regression is also referred to as trend analysis, all sampled points, or a sub-set of them, are used to compute a best fitting surface of one to three dimensions. Trend analysis is usually used as a global method of interpolation, to find underlying trends of a data set and remove them before further processing of the data.

Most existing methods for converting randomly distributed data into a regular grid have problems with large amounts of data, i.e. the time and memory required for the conversion does not grow linearly with the number of data point, but rather exponentially or worse. Therefore, there is a need for a method of converting large amount of randomly geographically distributed data into a regular grid or raster to enable more efficient radio network planning.

SUMMARY

The present invention enables efficient radio network planning in telecommunications.

According to a basic aspect, the present invention provides a method of converting randomly geographically distributed data into a regular grid or raster to enable more efficient radio network planning.

Basically, the present invention provides a method of enabling improved radio network planning for a predetermined geographical area in a telecommunication network, comprising the steps of providing S0 a plurality of data sampled at irregularly distributed measurement points, each data sample being represented by at least two geographical coordinates and at least one parameter value representative of a physical quantity associated with a radio network planning procedure. Subsequently, providing S1 a regular grid comprising a plurality of grid bins (raster elements). Thereafter, and for each said measurement point, locating S2 a subset of said grid bins within a predetermined distance from said measurement point, and determining S3 a respective contribution from said measurement point at each located grid bin in said subset, based at least on a respective distance between said data point and each said grid bin and said at least one parameter value of said measurement point, wherein at least a subset of said grid bins each receive contributions from at least three associated measurement points referred to as contributing measurement points, and wherein each such grid bin is referred to as an active or triggered grid bin. And finally for each active or triggered grid bin determining S4 a value of said parameter based on the determined respective contributions from the associated contributing measurement points.

Advantages of the Present Invention Comprise:
enabling efficient radio network planning

BRIEF DESCRIPTION OF THE DRAWINGS

The invention, together with further objects and advantages thereof, may best be understood by referring to the following description taken together with the accompanying drawings, in which.

DETAILED DESCRIPTION

The present invention will be described in the context of a radio network-planning tool for a telecommunication system. However, the invention is equally applicable to any system in which a large amount of geographically scattered measurement points represented by randomly geographically distributed measurements need to be converted to a regular grid or raster to enable an efficient analysis.

Important parts of the radio network planning process today is tuning and optimization that both largely are based on measured data, i.e. signal strength, in an existing radio network. The collection of measurement data is a more or less continuous process both in time and in space, i.e. measurement mobile units are mounted in a plurality of vehicles and are read for data at intervals. In order to be able to handle the large quantity of data efficient data management is needed in all parts of the system. Consequently, there is a large demand for methods the increases the efficiency and accuracy of data preparation for analysis in order to improve the speed at which the radio network can be improved. In essence, increasing the capacity and occupancy of the radio network.

In the present invention, first order polynomial regression has been studied for interpolation in the local neighbourhood of sampled data or measurement points. This interpolation method makes it possible to construct an algorithm that will step through the sampled points only once. The method can be considered as one of the least computationally intense, which the operator of any software usually appreciates, if the resulting accuracy is not unacceptable. The accuracy and performance of the method is thus interesting to test. However, it is quite possible to implement the methods and arrangements according to the present invention using higher order regression without departing from the basic concept.

As already stated in the background section, one of the major difficulties with handling of large quantities of data is the high computational load. This is even more so clear in the case of radio network planning. Since most radio network planning tools, or other tools, using 3D-data, for that matter, need to transfer scattered data into a more manageable form, i.e. regular grid, the computational load increases manifold when a large quantity of scattered data needs to be converted into a grid. The present invention enables this conversion in an efficient manner.

Figure 3:
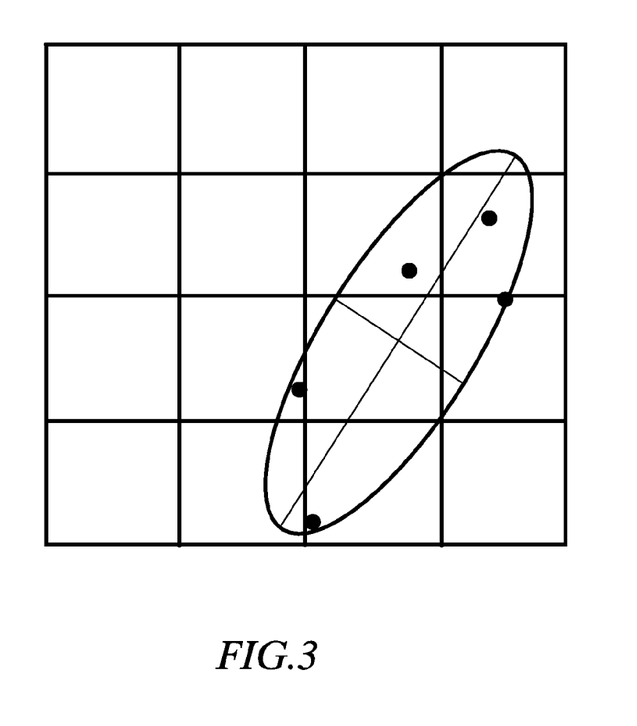
FIG. 3 illustrates a schematic flow diagram of an embodiment of a method of the present invention.

A basic embodiment of a method according to the present invention will be described below with reference to the schematic flow diagram of FIG. 3.

In its most basic form the present invention provides a method of enabling improved radio network planning for a predetermined geographical area in a telecommunication network. Accordingly the method comprises the initial step of providing S0 a plurality of data sampled at irregularly distributed measurement points, each data sample being represented by at least two geographical coordinates and at least one parameter value representative of a physical quantity associated with a radio network planning procedure. The data can be sampled as part of the method or merely be provided as input from an external provider. Subsequently, a regular grid comprising a plurality of grid bins is provided S1. The grid is typically a rectangular grid, however the method is equally applicable to any regular grid, i.e. circular or exponential.

For each provided measurement point at least a subset of all the grid bins within a predetermined distance from the measurement point are located S2. It can essentially be viewed as drawing a circle with a predetermined radius around the measurement point and identifying all grid points that are enclosed by that circle. This enables identifying all grid points that are in some manner affected by or get a contribution from the measurement point. Subsequently, the respective contribution from the measurement point at each located grid bin in the subset is determined S3, based at least on a respective distance between the data point and each said grid bin and said at least one parameter value of said measurement point, wherein at least a subset of said grid bins each receive contributions from at least three associated measurement points referred to as contributing measurement points, and wherein each such grid bin is referred to as an active or triggered grid bin.

Finally, for each such active or triggered grid bin a value of said parameter is determined S4 based on the determined respective contributions from the associated contributing measurement points.

In short, for each measurement point its respective contribution to each of a subset of the surrounding or neighbouring grid points are calculated. This enables going through each measurement point only once. Subsequently, the respective contributions for each grid point are used as basis for determining the parameter values for each grid point.

Consequently, each measurement point is only analyzed once which reduces the computational complexity of a subsequent radio network planning.

For further theoretical considerations the interested reader is referred to the following section and Appendix.

Figure 1:
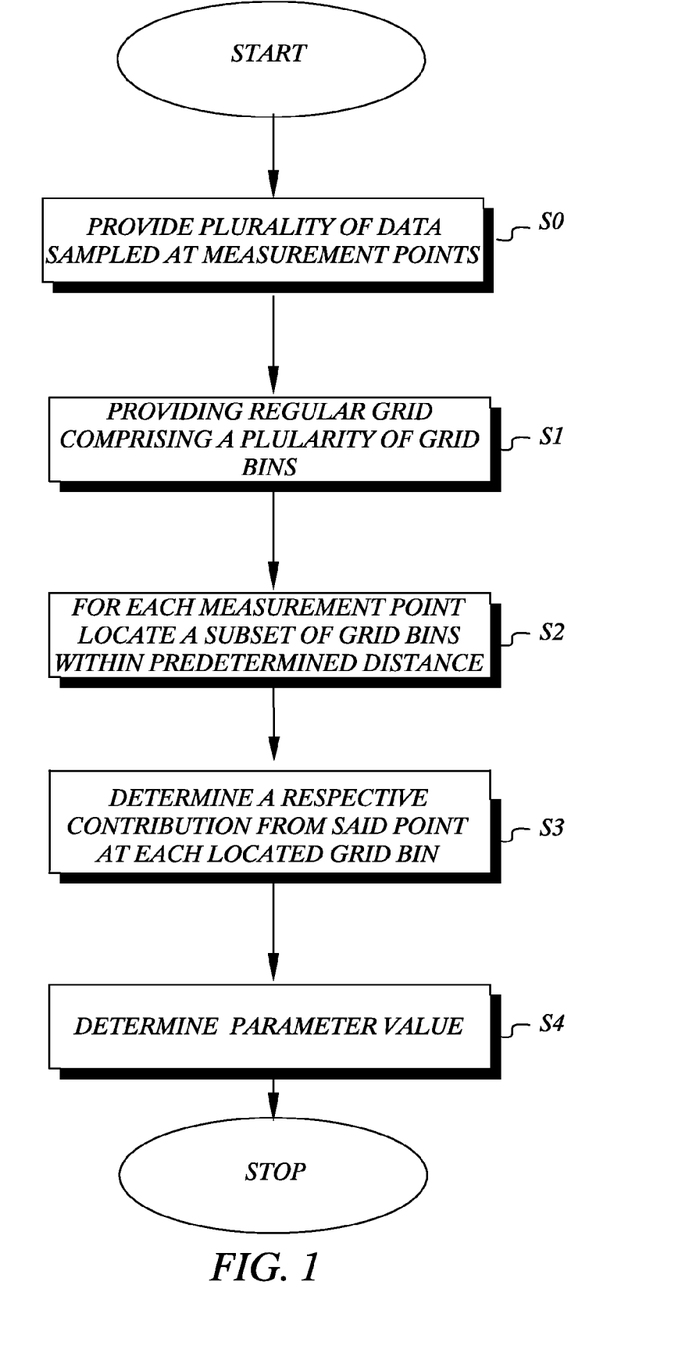
FIG. 1 illustrates a linear trend surface

On a theoretical level the problem to be solved when transforming scattered measurement data into a more manageable regular grid is to find a trend surface for each grid point. The lowest level of trend surface is the linear one (FIG. 1), and finding the parameters describing the surface is a rather straightforward, see Appendix 1. The data needed to compute the polynomial coefficients for the linear surface can be in the form of different summations of the distances between the grid point, bin, and the sampled measurement points, and of the sampled points attribute or parameter values. This makes it possible, according to the present invention, to run through the scattered or unsorted sampled measurement points only once and compute the distances to a subset of the bins, and increment those bins summations. The subset is a search window with a predetermined size (i.e. a predetermined circle radius) around each of the sampled points. When all sampled points have been used to increment the summations, the linear trend surface can be computed for each bin. With p denoting the number of sampled points, and n the number of bins, the number of operations can simplified be described as p·(subset of n)+n. Stepping through each bin instead, the number of operations will be n·p.

Although the method is straightforward, there are a few considerations that might need to be made, which will determine whether the result can be trusted or not. Using a local trend analysis to compute the Z-value of a number of grid points, the number of unknowns is reduced to one, and theoretically, only one sample point is needed for the computation. However, bearing in mind that it is a surface that is going to be determined, at least three sample points are needed nevertheless. In addition, and according to a further embodiment of the invention, the distribution of the sampled points might need to be considered in order to avoid any extrapolation.

As stated previously, the number of contributing sample points must be three or more, and thus the size of the search window is of importance. By its nature, the trend surface method will have a smoothing effect on the result. The more points used in the interpolation of the new values, the more smoothened the result will be. Nevertheless, on the other hand, from a purely mathematical point of view, more over determinations usually means that the solution of the unknowns will be more reliable. The main consideration, although, will probably be how large number of grid points with less than three contributing sample points that can be acceptable.

Figure 2:
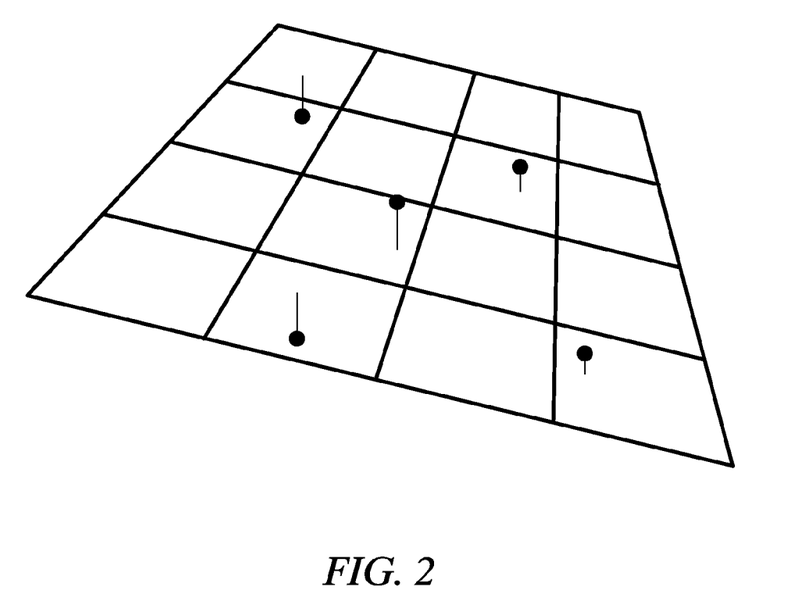
FIG. 2 illustrates an ellipsoid of confidence

Another point to consider is to avoid performing any extrapolations. If the sample points do not properly enclose the grid point, the computed value might be very suspect, especially if the convex polygon of the points is narrow and the surface is sloping steeply. If the sampled points are located in all four quadrants of the grid point there is no problem. However, if the sampled points are situated in only two of the quadrants, and on the same side of the grid point, the sampled points do clearly not enclose it and its value will be extrapolated. If the sampled points are in two opposite quadrants, or in three of them, some other means may need to be used to control if the grid point is enclosed or not, bearing in mind that it is only the summations that are stored. One solution, according to a specific embodiment, is to compute the ellipsoid of confidence for the contributing points (FIG. 2). See Appendix 2 for further details.

The statistically probability that one point is within one standard deviation from the centre of the ellipsoid of confidence is 68.2%, if the points can be considered to be of normal distribution. 1.96 times the standard deviation gives a probability of 95%, and multiplying the standard deviation with 2.58 raises the probability to 99%. When the size and orientation of the ellipsoid of confidence has been computed it is easy to make a test to see if the grid point is within the current ellipsoid or not.

If the standard deviation in one direction is equal to zero the sampled points used to compute the summations are all positioned along a straight line. If the grid point is situated on that line, a simple linear interpolation can be done, otherwise it should left out of the interpolation.

Depending on the number of sampled points and the size of the search window, there might thus be a number of grid points that have not got any interpolated values. To fill in the gaps, a well-known raster interpolation technique such as the bi-linear interpolation can be used.

In the above described algorithms made for the evaluation in embodiments of the present invention, the problem with automatic determination of the search window has been solved as follows, however also other methods are applicable. By making the assumption that, the sampled points are evenly distributed over the predetermined geographical area, the number of bins that each sample point must give a contribution to is computed. The size of the search window is set so that there are an average of about six points per bin. A test is also preferably made that the number of bins with contributions from less than three points does not exceed five percent. If it does, the search window is increased until the condition is fulfilled.

The term search window used above is represented by the aforementioned circle with a predetermined radius around each measurement point to select the subset of grid bins.

Figure 4:
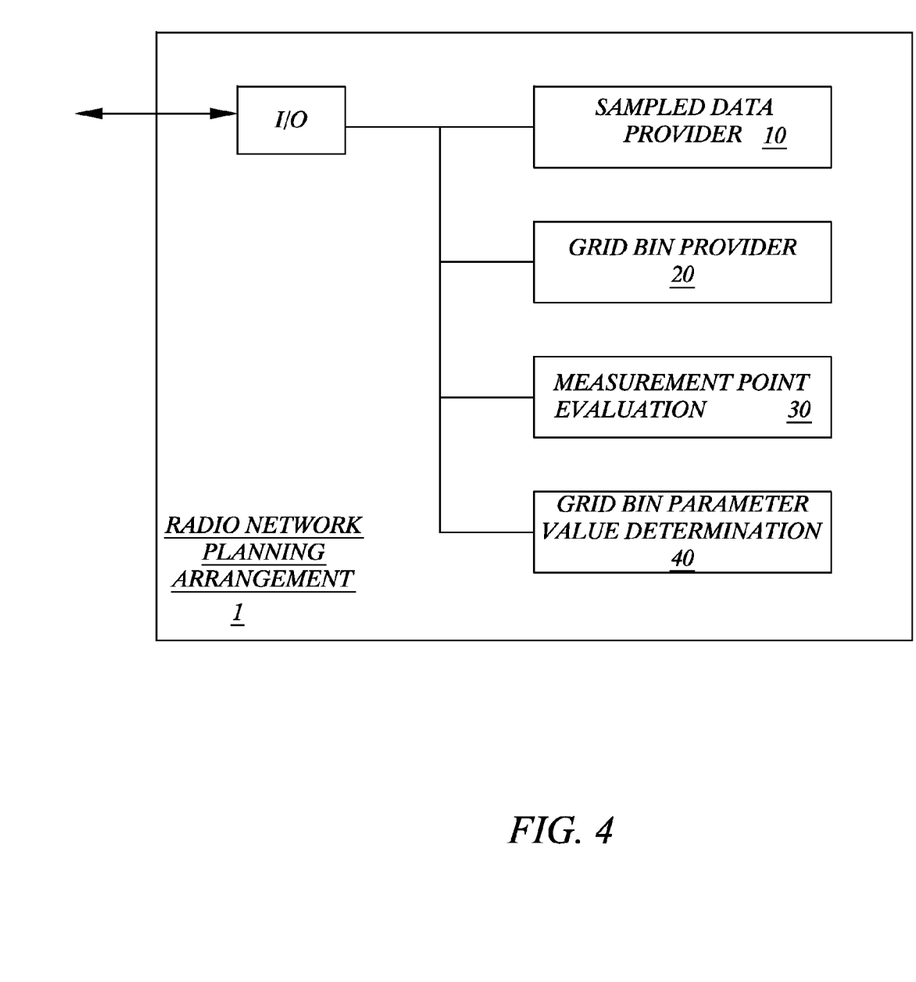
FIG. 4 illustrates a schematic block diagram of an embodiment of a system of the present invention.

An embodiment for an radio network planning apparatus according to the present invention will be described below with reference to FIG. 4.

The radio network planning apparatus 1, comprises a unit 10 for providing a plurality of data sampled at irregularly distributed measurement points, each data sample being represented by at least two geographical coordinates and at least one parameter value representative of a physical quantity associated with a radio network planning procedure. This unit can be implemented as an actual measuring unit in the tool, or preferably as a unit capable of receiving sampled data from one or several measuring units in the selected geographical area. In addition the tool 1 comprises a unit 20 for providing a regular grid comprising a plurality of grid bins. This unit 20 can be implemented to actually determine a suitable grid or to receive the grid from some external source in the tool or outside the tool. These two units 10, 20 are designed to set the boundaries of the sampled data in that they provide the actual measurements and its geographical area grid and the grid bins on which the measurement data is to be mapped.

Further, the apparatus 1 according to the embodiment of the invention comprises an evaluation unit 30 adapted to evaluate each said measurement point by locating a subset of the provided grid bins within a predetermined distance from, or search window enclosing, the measurement point, and determine a respective contribution from the measurement point at each located grid bin in the subset, based at least on a respective distance between the data point and each grid bin and the at least one parameter value of the measurement point. In addition, at least a subset of the grid bins each receive contributions from at least three associated measurement points referred to as contributing measurement points, and wherein each such grid bin is referred to as an active or triggered grid bin.

Finally the apparatus 1 comprises a unit 40 adapted to for each active or triggered grid bin determine a value of the previously mentioned parameter based on the determined respective contributions from the associated contributing measurement points.

The radio network planning apparatus 1, according to the present invention, can be implemented as one or more hardware or software components in a system, preferably in a radio network planning tool.

Below a series of verifying experimental results and conditions of specific embodiments of the present invention will be described.

The algorithm for the implementation of the trend surface in the local neighbourhood is quite simple. Each grid point will have nine parameters associated with it, the eight summations and the number of points used to produce them. A list of all sampled points is stepped through and the parameters for all grid points that are within the specified search window from each sample point are increased. When all the sampled points have been processed, the Z-value for the grid points having more than three points contributing to their summations can be computed.

Four Boolean parameters were added to each bin, which makes it is easy to sort out bins with contributions from points situated only in two quadrants on the same side. The method with the ellipsoid of confidence was used for the remainder of the bins, with the default size set to 1.96 times the standard deviation.

The bins that did not fulfil the conditions were interpolated using the bilinear technique.

The evaluation tests were made using a small rectangular area cut out from a digital elevation model. The area is containing 202 rows and 202 columns, with a bin size of 10 meters. A discrete number of scattered sample points were then randomly selected over the area. The selected points were used to interpolate a new grid, which was compared with the original. The bins selected to be used as sample data were selected as every nth plus a random number between 0 and m. In Table 1 below are the results presented in numbers.

TABLE 1

The mean values produced by 150 runs with each test configuration.

| | Mean absolute difference (m) | Mean standard deviation (m) | Mean # of sample points | Mean # of computed grid points | Mean # of grid points with <3 sample points | Mean # of grid points outside the confidence ellipsoid | Mean # of grid points with sample points on only one side |
|---|---|---|---|---|---|---|---|
| Trend surface only | 1.220 | 1.916 | 2295.1 | 33498.1 | 1642.0 | 1228.7 | 4399.1 |

TABLE 1-continued

The mean values produced by 150 runs with each test configuration.

|  | Mean absolute difference (m) | Mean standard deviation (m) | Mean # of sample points | Mean # of computed grid points | Mean # of grid points with <3 sample points | Mean # of grid points outside the confidence ellipsoid | Mean # of grid points with sample points on only one side |
|---|---|---|---|---|---|---|---|
| Including bi-linear interpolation | 1.240 | 1.948 | 2293.4 | 33513.3 | 1650.6 | 1226.8 | 4374.3 |
| Increased # of sample points | 0.955 | 1.576 | 5005.7 | 36490.1 | 891.5 | 563.1 | 2816.9 |
| Reduced search window by 1 step | 0.898 | 1.524 | 5004.9 | 27891.4 | 3820.0 | 1761.4 | 7166.5 |
| Reduced search window by 2 steps | 0.903 | 1.540 | 5003.3 | 19628.9 | 13295.0 | 1458.7 | 5983.3 |
| Increased search window by 1 step | 1.013 | 1.636 | 5009.0 | 38072.6 | 291.4 | 303.0 | 2128.4 |
| Increased search window by 2 steps | 1.099 | 1.731 | 5002.7 | 39250.6 | 82.067 | 137.6 | 1331.1 |
| 2.58 times standard deviation | 0.959 | 1.585 | 5004.1 | 36735.7 | 880.9 | 303.9 | 2841.7 |
| 3.29 times standard deviation | 0.960 | 1.588 | 5007.8 | 36850.2 | 896.7 | 197.2 | 2817.1 |
| 100 times standard deviation | 1.072 | 6.081 | 5010.1 | 37070.3 | 876.9 | 9.0 | 2806.2 |
| 0.5 times standard deviation | 0.980 | 1.587 | 5004.5 | 26992.8 | 901.0 | 10037.0 | 2831.0 |
| Even more increased # of sample points | 0.711 | 1.292 | 10013.0 | 36281.0 | 1698.0 | 180.0 | 2575.8 |
| Reduced # of sample points | 1.599 | 2.414 | 1123.1 | 35025.5 | 1555.9 | 772.1 | 3432.2 |

The original area contains 40804 bins.

The results show that, using this particular input data, the optimum size of the search window is reached when the size computed to give an average of six sample points per bin is reduced with one bin in each direction. The result is the same with other sets of sample points, both larger and smaller, although it is not presented here. The smoothing effect can be seen by the degrading of the resulting standard deviation with increasing size of the search window.

The properties of the bi-linear interpolation are similar to the ones of the linear trend surface, and the result is not degraded by much when using this method to compute values for the un-interpolated bins.

A too large ellipsoid of confidence will give some extreme values, which can clearly be seen on the standard deviation of the result. A too small ellipsoid will leave too many grid points to the bi-linear interpolation and the result will thus be a little degraded. No big difference can be seen using the three standard factors, 1.96, 2.58, and 3.29.

On a Pentium 166 MHz PC with 128 MB RAM the process time to step through the sampled points and construct the summations was, in average, $2.8 \cdot 10^{-3}$ ms/operation. With 5004 sample points and a search window of 10×10 bins this step took 1.4 seconds. The process time to compute the trend surfaces and assign values to the bins was $8.0 \cdot 10^{-3}$ ms/operation, and with 202×202 bins this process took 0.3 seconds. The ellipsoid of confidence was computed for about 40% of the bins, using the default settings.

Figure 5:
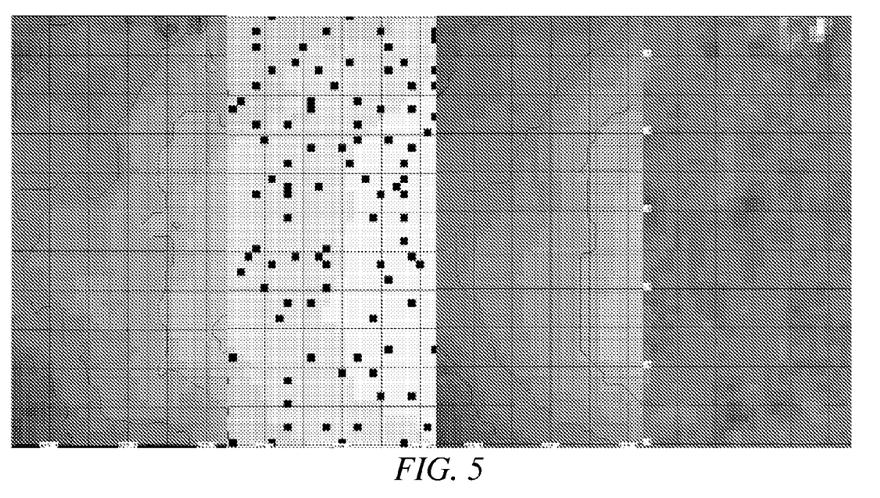
FIG. 5 illustrates a visual representation of the use of an embodiment of a method of the invention

FIG. 5 shows part of the original data, the distribution of the sample points, and the resulting interpolated area. A) shows part of the original raster data. B) displays the sample point locations, and C) the result after interpolation. Finally in D) are the differences between the original and the interpolated images presented. White colour mean that the new bin value is 10 units below the original, and black means that it is 10 units above, although the maximum positive difference in this example is 3 units.

Also, D) shows the differences between the original and interpolated areas. The sample points where randomly positioned to give a total number of 5000 over the whole area. The mean grey colour of D) is corresponding to a difference of 0 units. In the top right corner there is a peak, where the original data shows an altitude 10 units above the interpolated. Besides this area the difference is ±3 units. FIG. 3 is a representative example of the area as a whole.

The method according to the present invention works very well. It is fast, and the result is satisfactory. The test area is not the most appropriate, since it also contains some building heights. If a sample point is located on the roof of a building, the height of the area surrounding the house will be too high. In addition, if the sample point is at the side of the house, the height of the house itself will be too low. To get a good interpolation under such circumstances the number of the sample points need to be increased, and their positions more carefully selected.

On of the main features of this method is that the sample points will be used only once during the computation, without any sorting. All interpolation methods that need only a number of summations to produce an output value can be used. A polynomial of second or third degree would probably increase the accuracy of the interpolation, but would also mean that each bin would need to have a larger number of parameters. One consideration is to not let the resulting grid become too large. Each bin will have 40 bytes of data associated with it during the computation, using the configuration presented in this report.

The process time to produce the summations is linearly depending on the number of sampled points and on the size of the search window. The process time to compute each bin value is more complex, since it is depending on the distribution of contributing sample points for each bin. The more points per bin, the less bins with points in only two or three of their quadrants. A faster way of controlling that no extrapolation is done could help. Nevertheless, computing the bin values never took more than half the time, at most, it took to produce the summations, with the configuration used in this report.

An alternative embodiment would be to first sort the sample points and then to step through each bin and compute the distances to a subset of the points. However, sorting is a time consuming operation in itself, and usually there are more bins than sample points, which mean that this would be a less efficient method nevertheless.

It will be understood by those skilled in the art that various modifications and changes may be made to the present invention without departure from the scope thereof, which is defined by the appended claims.

APPENDIX 1

Computing the Trend Surface

The basic idea is to find the best fitting one-dimensional surface through the sampled data points by least squares. The equation of the surface can be written $$Z = a \cdot x + b \cdot y + c \tag{1}$$

where a, b, and c are the polynomial coefficients. The regression surface is computed such that the sum of the deviations is minimized over the number of sampled data points.

$$\min \Sigma(a \cdot x_i + b \cdot y_i + c - Z_i)^2 \tag{2}$$

Evaluating (2) will give raise to the following equations $$\Sigma x_i(a \cdot x_i + b \cdot y_i + c - Z_i) = 0$$

$$\Sigma y_i(a \cdot x_i + b \cdot y_i + c - Z_i) = 0$$

$$\Sigma(a \cdot x_i + b \cdot y_i + c - Z_i) = 0 \tag{3}$$

which can be expressed as $$a \cdot Sxx + b \cdot Sxy + c \cdot Sx = Sxz$$

$$a \cdot Sxy + b \cdot Syy + c \cdot Sy = Syz$$

$$a \cdot Sx + b \cdot Sy + c \cdot n = Sz \tag{4}$$

where Smn denotes the different summations, for example Sxx denotes $\Sigma x_i^2$. Each grid point that is going to be determined is put in the centre of the surface by substituting x and y with the distances in the x- and y-directions to each used sample point. The value of the grid point will then become equal to the polynomial coefficient c. In other words, to interpolate a value for a specific grid point the problem is now reduced to find c, which is solved for in equation (5) below.

$$c = \frac{\begin{pmatrix} Sx \cdot Syy \cdot Sxz - Sx \cdot Sxy \cdot Syz + Sy \cdot Syz \cdot Sxx - Sy \cdot \\ Sxy \cdot Sxz - Sz \cdot Syy \cdot Sxx + Sz \cdot Sxy^2 \end{pmatrix}}{\begin{pmatrix} -n \cdot Syy \cdot Sxx + n \cdot Sxy^2 + Sy^2 \cdot Sxx - \\ 2 \cdot Sxy \cdot Sy \cdot Sx + Syy \cdot Sx^2 \end{pmatrix}} \tag{5}$$

APPENDIX 2

First, the direction of the ellipsoid's major axis is found by computing the regression line minimizing the perpendicular distances from the points. The slope, k, of the major axis is computed by using the following equations:

$$y = k \cdot x + m \tag{6}$$

$$A = n \cdot Sxx - Sx^2 \tag{7}$$
$$B = n \cdot Sxy - Sx \cdot Sy$$
$$C = n \cdot Syy - Sy^2$$
$$D = \frac{(C - A)}{2 \cdot B}$$
$$E = \sqrt{1 + D^2}$$
$$k_1 = D + E$$
$$k_2 = D - E$$
$$d_1 = \frac{(k_1^2 \cdot A - 2 \cdot k_1 \cdot B - C)}{(1 + k_1^2)}$$
$$d_2 = \frac{(k_2^2 \cdot A - 2 \cdot k_2 \cdot B - C)}{(1 + k_2^2)}$$

And finally k is set equal to the $k_i$ giving the smallest value of di. The centre of the ellipsoid will be the average values of $x_i$ and $y_i$. The shape of the ellipsoid can be determined by computing the standard deviations along its axes. This will make it necessary to transform the summations to a coordinate system with its origin at the centre of the ellipsoid of confidence and the axes coinciding with the ellipsoid's axes. A two-dimensional Helmert transformation can be used $$\begin{bmatrix} x \\ y \end{bmatrix} = \begin{bmatrix} \cos\varphi & -\sin\varphi \\ \sin\varphi & \cos\varphi \end{bmatrix} \cdot \begin{bmatrix} x_T \\ y_T \end{bmatrix} + \begin{bmatrix} x_0 \\ y_0 \end{bmatrix} \tag{8}$$

where $$\cos\varphi = \frac{1}{\pm\sqrt{1+k^2}} \quad x_0 = \frac{Sx}{n} \tag{9}$$

$$\sin\varphi = \frac{k}{\pm\sqrt{1+k^2}} \quad y_0 = \frac{Sy}{n}$$

But in this case we look for the transformed coordinates $x_T$ and $y_T$, why the inverse transformation must be done $$\begin{bmatrix} x_T \\ y_T \end{bmatrix} = \begin{bmatrix} a_{11} & a_{12} \\ a_{21} & a_{22} \end{bmatrix} \cdot \begin{bmatrix} x \\ y \end{bmatrix} + \begin{bmatrix} a_{13} \\ a_{23} \end{bmatrix} \tag{10}$$

with $$\begin{bmatrix} a_{11} & a_{12} \\ a_{21} & a_{22} \end{bmatrix} = \begin{bmatrix} \frac{\cos\varphi}{\cos^2\varphi + \sin^2\varphi} & \frac{\sin\varphi}{\cos^2\varphi + \sin^2\varphi} \\ \frac{-\sin\varphi}{\cos^2\varphi + \sin^2\varphi} & \frac{\cos\varphi}{\cos^2\varphi + \sin^2\varphi} \end{bmatrix} \quad (11)$$

$$\begin{bmatrix} a_{13} \\ a_{23} \end{bmatrix} = \begin{bmatrix} -a_{11} \cdot x_0 - a_{12} \cdot y_0 \\ -a_{21} \cdot x_0 - a_{22} \cdot y_0 \end{bmatrix}$$

and thus the summations can be transformed into the new system $$Sx_T = a_{11} \cdot Sx + a_{12} \cdot Sy + a_{13} \cdot n$$

$$Sy_T = a_{21} \cdot Sx + a_{22} \cdot Sy + a_{23} \cdot n$$

$$Sxx_T = a_{11}^2 \cdot Sxx + a_{12}^2 \cdot Syy + a_{13}^2 \cdot n + 2 \cdot a_{11} \cdot a_{12} \cdot Sxy + 2 \cdot a_{11} \cdot a_{13} \cdot Sx + 2 \cdot a_{12} \cdot a_{13} \cdot Sy$$

$$Syy_T = a_{21}^2 \cdot Sxx + a_{22}^2 \cdot Syy + a_{23}^2 \cdot n + 2 \cdot a_{21} \cdot a_{22} \cdot Sxy + 2 \cdot a_{21} \cdot a_{23} \cdot Sx + 2 \cdot a_{22} \cdot a_{23} \cdot Sy \quad (12)$$

Finally the standard deviations in the transformed coordinate system can be computed $$\sigma_{x_T} = \sqrt{\frac{Sxx_T - \frac{Sx_T^2}{n}}{n-1}} \quad (13)$$

$$\sigma_{y_T} = \sqrt{\frac{Syy_T - \frac{Sy_T^2}{n}}{n-1}}$$

The invention claimed is:

1. A method of enabling improved radio network planning for a predetermined geographical area in a telecommunication network, comprising the steps of:
    providing a plurality of data sampled at irregularly distributed measurement points, each data sample being represented by at least two geographical coordinates and at least one parameter value representative of a physical quantity associated with a radio network planning procedure;
    providing a regular grid comprising a plurality of grid bins;
    for each said measurement point:
        locating a subset of said grid bins within a predetermined distance from said measurement point; and
        determining a respective contribution from said measurement point at each located grid bin in said subset, based at least on a respective distance between said measurement point and each said grid bin and said at least one parameter value of said measurement point, wherein at least a subset of said grid bins each receive contributions from at least three associated measurement points referred to as contributing measurement points, and wherein each such grid bin is referred to as an active or triggered grid bin; and
    for each active or triggered grid bin:
        determining a value of said parameter based on the determined respective contributions from the associated contributing measurement points.

2. The method according to claim 1, wherein said parameter value comprises at least one of a signal strength, an altitude measure, a geographical measure, a radio property measure.

3. The method according to claim 1, wherein the parameter value for each respective active or triggered grid bin is determined by an osculating plane based on the contributions from the contributing data points.

4. The method according to claim 1, comprising the further step of determining if the number of active grid bins is above a predetermined threshold.

5. The method according to claim 4, comprising the step of increasing the predetermined distance if the number of active grid bins is below said threshold.

6. The method according to claim 1, comprising the additional step of calculating a size and direction of an ellipsoid of confidence for the contributing measurement points for each grid point.

7. The method according to claim 6, comprising the step of determining if the grid point is within the thus calculated ellipsoid of confidence for its contributing points to prevent extrapolation of parameter values.

8. A radio network planning arrangement comprising one or more processing circuits configured to:
    provide a plurality of data sampled at irregularly distributed measurement points, each data sample being represented by at least two geographical coordinates and at least one parameter value representative of a physical quantity associated with a radio network planning procedure;
    provide a regular grid comprising a plurality of grid bins;
    evaluate each said measurement point by:
        locating a subset of said grid bins within a predetermined distance from said measurement point;
        determining a respective contribution from said measurement point at each located grid bin in said subset, based at least on a respective distance between said measurement point and each said grid bin and said at least one parameter value of said measurement point, wherein at least a subset of said grid bins each receive contributions from at least three associated measurement points referred to as contributing measurement points, and wherein each such grid bin is referred to as an active or triggered grid bin; and
    for each active or triggered grid bin:
        determine a value of said parameter based on the determined respective contributions from the associated contributing measurement points.

9. The arrangement according to claim 8, wherein the one or more processing circuits are configured to determine if the number of active grid bins is above a predetermined threshold.

10. The arrangement according to claim 8, wherein the one or more processing circuits are configured to calculate a size and direction of an ellipsoid of confidence for the contributing measurement points for each grid point.

* * * * *